United States Patent

Zeman

[15] 3,659,148

[45] Apr. 25, 1972

[54] LAMP MODULATOR

[72] Inventor: John R. Zeman, Cocoa Beach, Fla.

[73] Assignee: The United States of America as represented by the Administrator of the National Aeronautics and Space Administration

[22] Filed: Dec. 16, 1970

[21] Appl. No.: 98,517

[52] U.S. Cl. ..................................315/135, 315/349, 330/2, 330/59, 340/332

[51] Int. Cl. ..................................................H05b 41/392

[58] Field of Search ..................................315/349, 129–136; 330/2, 59; 340/332

[56] References Cited

UNITED STATES PATENTS 3,099,827 7/1963 Wu ............................................330/2

*Primary Examiner*—John Kominski
*Attorney*—James O. Harrell and John R. Manning

[57] ABSTRACT

An electronic apparatus for generating a visual indication of the presence and magnitude of a signal. The apparatus includes a first amplifying transistor which amplifies an alternating electrical signal. A switching transistor is coupled to the output of the first transistor and is turned on by a portion of the positive half of the cycle of the signal. When the switching transistor is turned on it allows a capacitor to discharge therethrough for illuminating a lamp. The duration that the switching transistor turns on is directly proportional to the amplitude of the signal being monitored and, as a result, the intensity of the light produced by the lamp is directly proportional thereto.

2 Claims, 3 Drawing Figures

Patented April 25, 1972 3,659,148

Figures 1, 2:
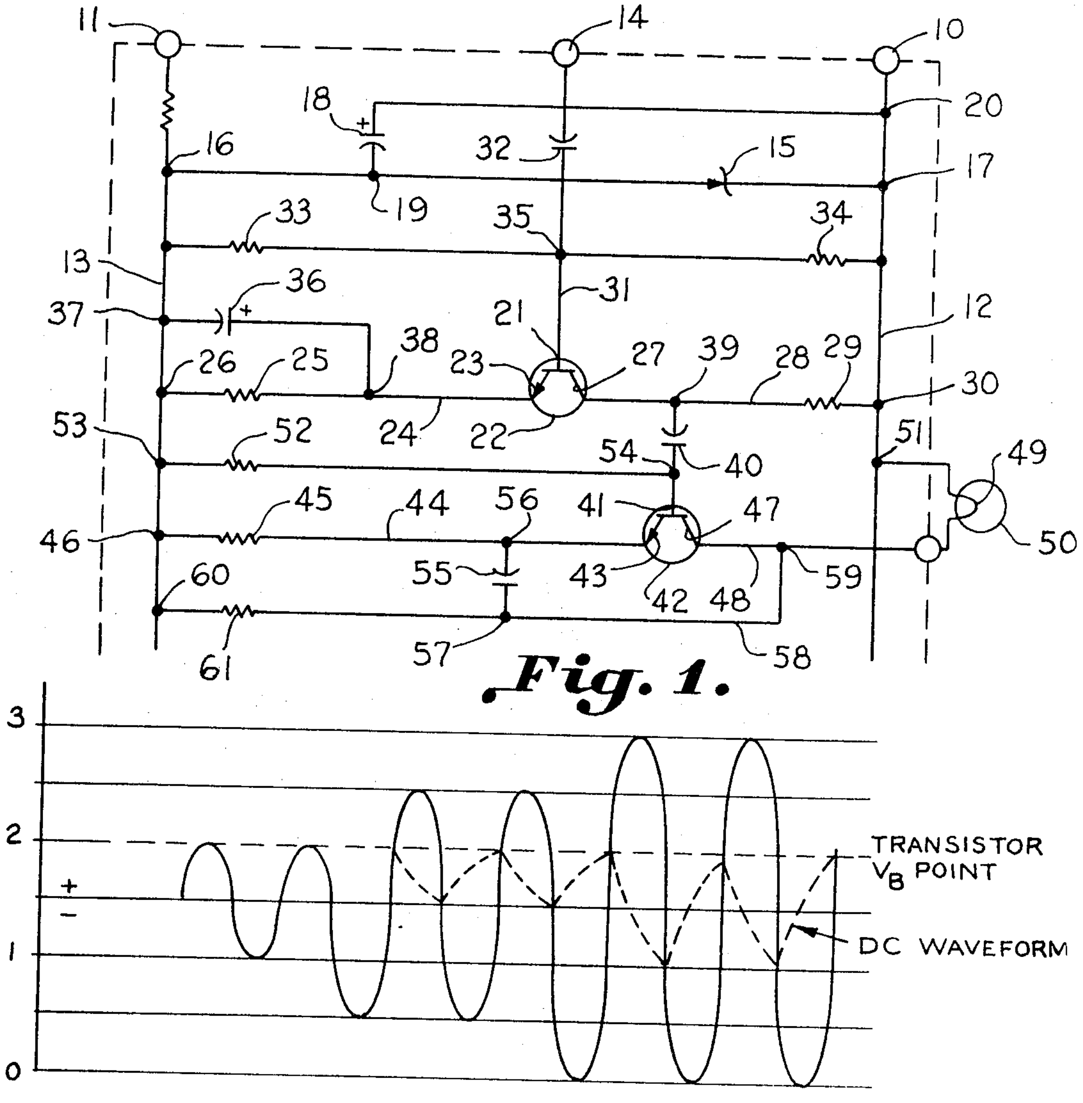

INVENTOR.
JOHN R. ZEMAN

BY James O. Harrell
ATTORNEY

LAMP MODULATOR

This invention described herein was made by an employee of the United States Government, and may be manufactured and used by or for the Government for Governmental purposes without the payment of any royalties thereon or therefor.

This invention relates to an electronic apparatus which monitors electrical signals, and more particularly to an electronic apparatus which generates a visual signal that is directly proportional to the amplitude of the signal being monitored.

Heretofore, devices for generating visual signals, such as illuminating lamps, usually depended on an "On - Off" type of operation for indicating when a signal was present. There are other devices used for monitoring audio signals which rely on dividing the audio signals into various frequency spectrums. These signals are then used for illuminating colored lamps according to the frequency of the audio signals being received. For example, if the audio signal is a low frequency, a red lamp may be illuminated whereas, if the audio signal is a high frequency, then a blue lamp may be illuminated. These devices are usually utilized in the entertainment field and not practical for monitoring signals from missiles and the like.

In the communication field, especially where equipment for monitoring a single signal is located in several buildings, it is desired to know whether the same quality signal is being received at the various locations. This is especially true in the space industry, wherein various operations are conducted in various buildings located at different sites around a launch platform. Each of these buildings is assigned a particular job and it receives its information from a common communication signal. It has been found however, that sometimes one of the buildings may be receiving a signal at a lower amplitude than the other buildings, or all of the buildings could be receiving a signal which is below a predetermined desired or acceptable level.

Normally, the operators sit before a console while analyzing and receiving these audio signals, and it is desired to have a visual check on this signal so that if components located in one particular area are receiving a weak signal the operator would be alerted to such a fact by an alarm lamp becoming dimmer or cutting off completely. When the operator detects that he is receiving a weak signal he can notify the master control area, and through process of elimination the master control area can determine whether the problem is in the signal being transmitted or at the particular location receiving the below level signal.

In accordance with the present invention, it has been found that difficulties encountered with monitoring signals may be overcome by providing a novel apparatus. This apparatus, when used to monitor an alternating electrical signal, such as an audio signal, includes the following basic parts: (1) a D.C. voltage source having a positive and negative terminal, (2) a first amplifying transistor coupled to the D.C. voltage source, (3) means for coupling the electrical signal being monitored to the amplifying transistor for amplifying the alternating electrical signal, (4) a switching transistor having base, emitter and collector electrodes, (5) means coupling the base electrodes of the switching transistor to the amplifying transistor for receiving the amplified alternating signals, (6) a first circuit coupling the emitter electrode to the negative terminal of the D.C. voltage source, (7) a second circuit coupling the collector electrode to the negative terminal of the D.C. voltage source, (8) a filament type lamp coupled in a third circuit between the positive terminal of the D.C. voltage source and the collector electrode of the switching transistor, (9) a capacitor coupled between the first and second circuits being charged by the D.C. voltage source, and (10) means for placing a bias on the base electrode of the switching transistor for turning the switching transistor on only during a portion of the positive portion of the cycle of the signal. Thus, the capacitor discharges through the switching transistor illuminating the lamp to an intensity proportional to the amplitude of the signal.

Accordingly, it is an important object of the present invention to provide a visual illumination system for producing a visual indication as to the amplitude of an A.C. signal.

Another important object of the present invention is to provide a simple and accurate circuit which produces a visual indication for audio signals.

Still another important object of the present invention is to provide an apparatus which produces a visual indication indicating any noises or disturbances that appear in a signal being monitored.

Figure 3:
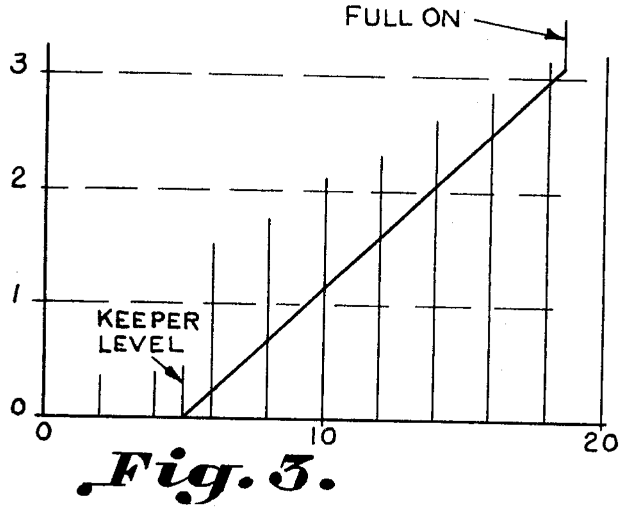

Other objects and advantages of this invention will become more apparent from a reading of the following detailed description and appended claims, taken in conjunction with the accompanying drawing wherein:

FIG. 1 is a schematic diagram showing an apparatus for monitoring an alternating electrical signal, FIG. 2 is a wave form illustrating a signal being monitored and a D.C. signal which is utilized to illuminate the lamp, and FIG. 3 is a diagram illustrating a comparison between the signal and the lamp voltage.

Referring to FIG. 1 of the drawing, a minus 24 volt D.C. voltage source is applied across positive and negative terminals 10 and 11, respectively, which are, in turn, connected to leads 12 and 13. Terminal 14 is provided for receiving the incoming audio signal which is to be monitored. Coupled between the leads 12 and 13 is a Zener diode 15 which has its anode coupled to junction 16 and its cathode coupled to junction 17. The purpose of the Zener diode 15 is to regulate the operating voltage of the circuit down to 20 volts, and also to prevent current fluctuations which may take place in the circuit therebelow from being fed back into the D.C. power supply coupled to terminals 10 and 11. A filter capacitor 18 is coupled between junction 19, interposed between Zener diode 15 and junction 16, and junction 20 interposed in lead 12.

The incoming audio signal is applied to junction 14 and is fed to a base electrode 21 of an NPN amplifying transistor 22. The emitter electrode 23 of transistor 22 is coupled by means of lead 24 and a resistor 25 to junction 26 interposed in lead 13. The collector electrode 27 is coupled by lead 28 through resistor 29 to junction 30 interposed in lead 12. Interposed in lead 31 between the base electrode 21 and the input terminal 14 is a coupling capacitor 32.

When the alternating audio signal comes in on lead 31 to the base electrode 21 of amplifying transistor 22 such causes transistor 22 to amplify the signal producing an alternating amplified signal on the collector electrode 27 proportional to the incoming audio signal at junction 14.

A pair of biasing resistors 33 and 34 are coupled between lead 13 and junction 35 and lead 12 and junction 35, respectively. These biasing resistors 33 and 34 establish the operating point of the NPN transistor 22. Resistor 25 is coupled between junctions 38 and 26 which are interposed in leads 24 and 13, respectively. Resistor 29 is coupled between junctions 30 and 39 which are interposed in leads 12 and 28, respectively. Resistors 25 and 29 along with capacitor 36 thence establish the operating gains of amplifier 22. The values of these resistors are selected according to the transistor used and the desired gain of amplifier 21. A bypass capacitor 36 is coupled between junction 37 interposed in lead 13 and junction 38 interposed in lead 24 so that the general operating range of transistor 22 will be stabilized.

The collector electrode 27 of the amplifying transistor 22 is coupled to junction 39 interposed in lead 28. Also, coupled to junction 39 is a coupling capacitor 40 which is, in turn, coupled to the base electrode 41 of an NPN switching transistor 42. The emitter electrode 43 is coupled by a first circuit to the negative terminal 11 of the D.C. voltage source. The first circuit includes lead 44, resistor 45, junction 46 and lead 13. The collector electrode 47 of transistor 42 is, in turn, coupled via lead 48 to one side of the filament 49 of the indicating lamp 50. The other side of the filament 49 of the indicating lamp 50 is, in turn, coupled to junction 51 interposed in lead 12.

Resistor 52 is coupled between junction 53 and junction 54 interposed in the lead connecting coupling capacitor 40 to the base electrode 41 of transistor 42. This resistor 52 establishes the "turn-on" point of transistor 42 to a voltage level VB which is above a predetermined value in the positive half of the operating cycle. It is desired only to use a portion of one-half of the operating cycle of the audio signal for switching transistor 42 "on." If the entire signal were used, such would short capacitor 55 coupled to the emitter electrode 43 of the transistor 42.

It is noted that the capacitor 55 is coupled between junction 56 interposed in lead 44, and junction 57 interposed in lead 58. Lead 58 extends between junction 59 interposed in lead 48 and junction 60 interposed in lead 13 and defines a second circuit. A resistor 61 is coupled between junction 60 and 57. Resistor 61 is provided for establishing a "keeper-current" in the circuit to maintain the filament 49 of the lamp 50 heated so that such reacts to changes instantaneously. Another reason for providing resistor 61 in the second circuit is to avoid thermal shock on the filament 49 of lamp 50. Another reason for providing resistor 61 in the second circuit is to reduce the bulb 50, filament 49 resistance excursions when the bulb is turned on. When the signal coming in on the base electrode 41 exceeds VB (FIG. 2) set up by resistor 52, transistor 42 turns on and begins conducting. This allows capacitor 55 which was previously charged by the biasing voltage set by resistor 61 to discharge back through transistor 42 and, applying the operating voltage of approximately 20 volts which is across leads 12 and 13 to the filament 49 of lamp 50. When the transistor 42 turns off again when the voltage level drops below VB and during the other half of the incoming signal capacitor 55 will again recharge back to the steady state biasing voltage across leads 12 and 13. The time-constant of capacitor 55 will establish the mean time-constant of the D.C. value that is being fed to the lamp filament 49. This is in proportion to the amplitude of the signals being received at terminal 14 and, as a result, on the base of transistor 42. Therefore, if the amplitude increases such causes transistor 42 to remain on for a longer period of time allowing the mean D.C. signal (See FIG. 2) produced by capacitor 55 to increase causing the filament 49 of lamp 50 to heat up to a greater degree thus, illuminating the lamp greater. When the audio signal decreases, the "On" time of transistor 42 also decreases thus decreasing the mean D.C. value of the signal being applied to the filament 49. As a result a lamp 50 is illuminated to an intensity proportional to the incoming audio signal.

FIG. 3 illustrates how the lamp voltage varies according to the signal being monitored.

While a preferred embodiment of the invention has been described using specific terms, such description is for illustrative purposes only, and it is to be understood that changes and variations may be made without departing from the spirit or scope of the following claims.

I claim:

1. An apparatus for monitoring an alternating electrical signal having a cycle including a positive and negative portion for generating a visual signal having an intensity proportional to the amplitude of said electrical signal being monitored comprising:

A. a D.C. voltage source having a positive and negative terminal;

B. an amplifying transistor coupled to said D.C. voltage source;

C. means for coupling said electrical signal to said amplifying transistor for amplifying said alternating electrical signal;

D. a switching transistor having base, emitter and collector electrodes;

E. means for coupling said base electrode of said switching transistor to said amplifying transistor for receiving said amplified alternating signal;

F. a first circuit coupling said emitter electrode to said negative terminal of said D.C. voltage source, G. a second circuit coupling said collector electrode to said negative terminal of said D.C. voltage source;

H. a filament type lamp coupled in a third circuit between said positive terminal of said D.C. voltage source and said collector electrode of said switching transistor;

I. a capacitor coupled between said first and second circuits being charged by said D.C. voltage source;

J. means for placing a bias on said base electrode of said switching transistor for turning said switching transistor on only during a portion of said positive portion of said cycle of said signal;

whereby said capacitor discharges through said switching transistor illuminating said lamp to an intensity proportional to the amplitude of said signal.

2. The apparatus as set forth in claim 1 further comprising:

A. a by-pass resistor interposed in said second circuit for maintaining said filament of said lamp warm.

* * * * *